United States Patent
Kang et al.

(10) Patent No.: US 8,791,986 B2
(45) Date of Patent: Jul. 29, 2014

(54) DISPLAY APPARATUS AND CONTROL METHOD THEREOF

(75) Inventors: Sung-rae Kang, Seoul (KR);
Jong-whan Lee, Yongin-si (KR);
You-young Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 12/855,941

(22) Filed: Aug. 13, 2010

(65) Prior Publication Data
US 2011/0149030 A1    Jun. 23, 2011

(30) Foreign Application Priority Data

Dec. 21, 2009 (KR) .......................... 10-2009-0128540
Jul. 1, 2010 (KR) .......................... 10-2010-0063518

(51) Int. Cl.
*H04N 21/4402* (2011.01)

(52) U.S. Cl.
USPC .......................................................... 348/43

(58) Field of Classification Search
USPC .................................. 348/43, 51, 154, 56, 53
See application file for complete search history.

(56) References Cited

U.S. PATENT DOCUMENTS

| | | | |
|---|---|---|---|
| 5,786,848 A | 7/1998 | Isobe et al. | |
| 6,288,731 B1 * | 9/2001 | Mizutani | 345/572 |
| 7,724,271 B2 * | 5/2010 | Ha et al. | 345/698 |
| 7,804,995 B2 * | 9/2010 | Lipton et al. | 382/154 |
| 8,334,896 B2 * | 12/2012 | Park et al. | 348/51 |
| 2002/0060746 A1 * | 5/2002 | Yugami et al. | 348/458 |
| 2002/0196332 A1 | 12/2002 | Lipton et al. | |
| 2004/0218269 A1 * | 11/2004 | Divelbiss et al. | 359/464 |
| 2005/0024532 A1 | 2/2005 | Choi | |
| 2006/0062490 A1 * | 3/2006 | Ha et al. | 382/298 |
| 2006/0203085 A1 * | 9/2006 | Tomita | 348/51 |
| 2010/0033555 A1 * | 2/2010 | Nagase et al. | 348/43 |

(Continued)

FOREIGN PATENT DOCUMENTS

| | | |
|---|---|---|
| EP | 0 969 676 A2 | 1/2000 |
| EP | 2 306 738 A1 | 4/2011 |

(Continued)

OTHER PUBLICATIONS

Communication dated Sep. 29, 2011 from the Korean Intellectual Property Office in counterpart Korean application No. 1020100063518.

(Continued)

*Primary Examiner* — Christopher S Kelley
*Assistant Examiner* — Deirdre Beasley
(74) *Attorney, Agent, or Firm* — Sughrue Mion, PLLC

(57) ABSTRACT

Disclosed are a display apparatus and a control method thereof. The display apparatus may include a signal receiving unit which receives a three-dimensional (3D) image signal, the 3D image signal including a left eye image and a right eye image; a converter which converts a format of the 3D image signal into a second transmission format if the format of the 3D image signal is of a first transmission format; a 3D processor which processes the converted 3D image signal for 3D display; and a display unit which performs the 3D display with regard to the processed 3D image signal. With this configuration, it is possible to convert a 3D image signal of a new standard into a format which can be processed by a system which processes a 3D image signal according to a previously existing standard.

27 Claims, 14 Drawing Sheets

(56) References Cited

U.S. PATENT DOCUMENTS

| | | | |
|---|---|---|---|
| 2010/0157032 A1* | 6/2010 | Park et al. | 348/57 |
| 2010/0225645 A1* | 9/2010 | Suh et al. | 345/419 |
| 2010/0302634 A1* | 12/2010 | Jung | 359/465 |
| 2011/0032331 A1* | 2/2011 | Chen et al. | 348/43 |
| 2011/0036612 A1* | 2/2011 | Jung et al. | 174/50.5 |
| 2011/0050862 A1* | 3/2011 | Cheng et al. | 348/51 |
| 2011/0050863 A1* | 3/2011 | Choi et al. | 348/51 |
| 2011/0157310 A1* | 6/2011 | Mitani et al. | 348/43 |
| 2012/0050507 A1* | 3/2012 | Keys | 348/56 |
| 2012/0327072 A1* | 12/2012 | Jeon et al. | 345/419 |

FOREIGN PATENT DOCUMENTS

| | | |
|---|---|---|
| JP | 2008193693 A | 8/2008 |
| KR | 101998053563 A | 9/1998 |
| KR | 10-0530871 B1 | 5/2000 |
| KR | 10-2000-0033198 A | 6/2000 |
| KR | 10-2004-0001831 A | 1/2004 |
| KR | 100716982 B1 | 5/2004 |
| KR | 10-2006-0006706 A | 1/2006 |
| KR | 10-2007-0082388 A | 8/2007 |

OTHER PUBLICATIONS

Communication dated Jun. 14, 2013, issued by the European Patent Office in counterpart European Patent Application No. 10172064.7.

"High-Definition Multimedia Interface Specification Version 1.4a Extraction of 3D Signaling Portion"; High Definition Multimedia Interface Specification; XP002677171; Mar. 4, 2010; pp. 1-28.

"High-Definition Multimedia Interface Specification Version 1.4"; Internet Citation; http://wenku.baidu.com/view/e7db77d184254b35eefd34d0.htm; XP009133650; Jun. 5, 2009; 425 pgs.

Office Action issued Apr. 28, 2010 in counterpart Korean Application No. 10-2009-0128540.

* cited by examiner

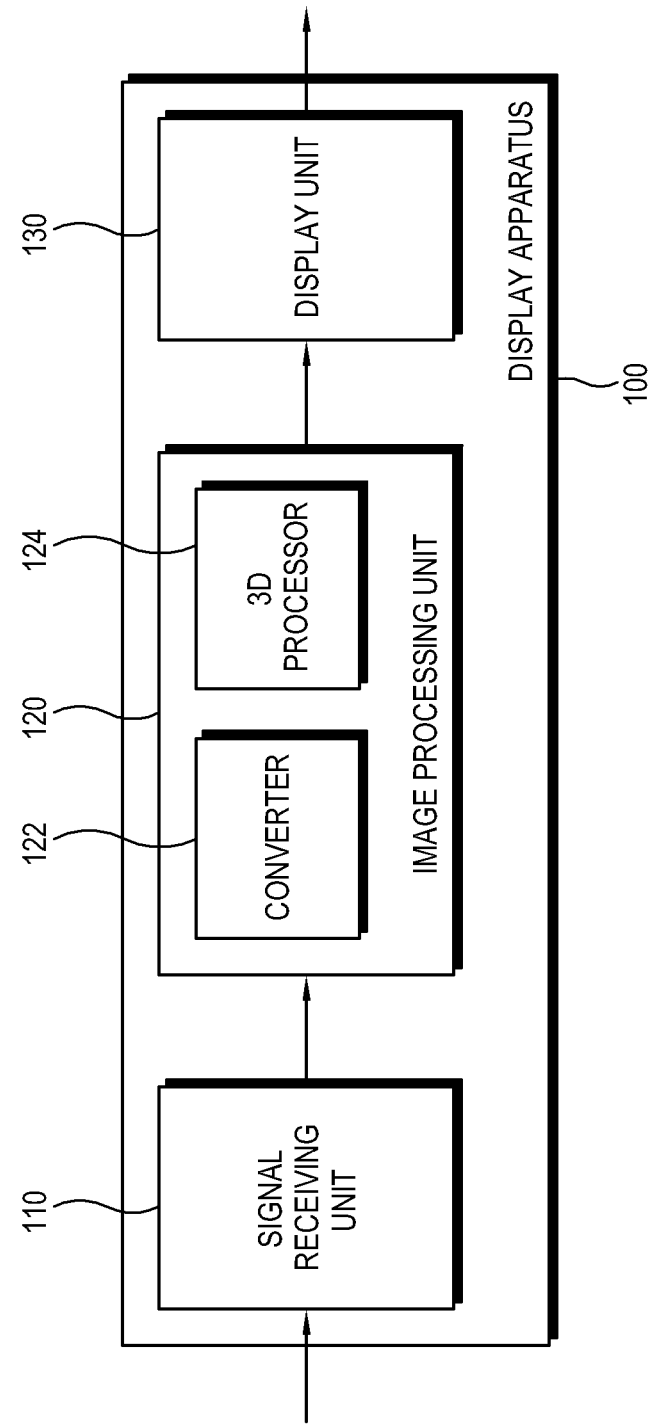

FIG. 3

| description | H Size | | V Size | | |
|---|---|---|---|---|---|
| | H Total | H Blank | V active | V Total | V Blank |
| | Hactive | | V active + V space | Vact space | |
| 1080p 24Hz | 1920 | 830 | 2160 (1080X2) | 2250 | 45 |
| | 2750 | | 2205 | 45 | |
| 720p 60Hz Frame packing | 1280 | 370 | 1440 (720X2) | 1500 | 30 |
| | 1650 | | 1470 | 30 | |
| 1080i 60Hz | 1920 | 280 | 2160 (540X4) | 2250 | 22 |
| | 2200 | | 2228 | 23,22,23 | |

310
311
312
313
320
321
322
323
330
331
332
333

FIG. 4
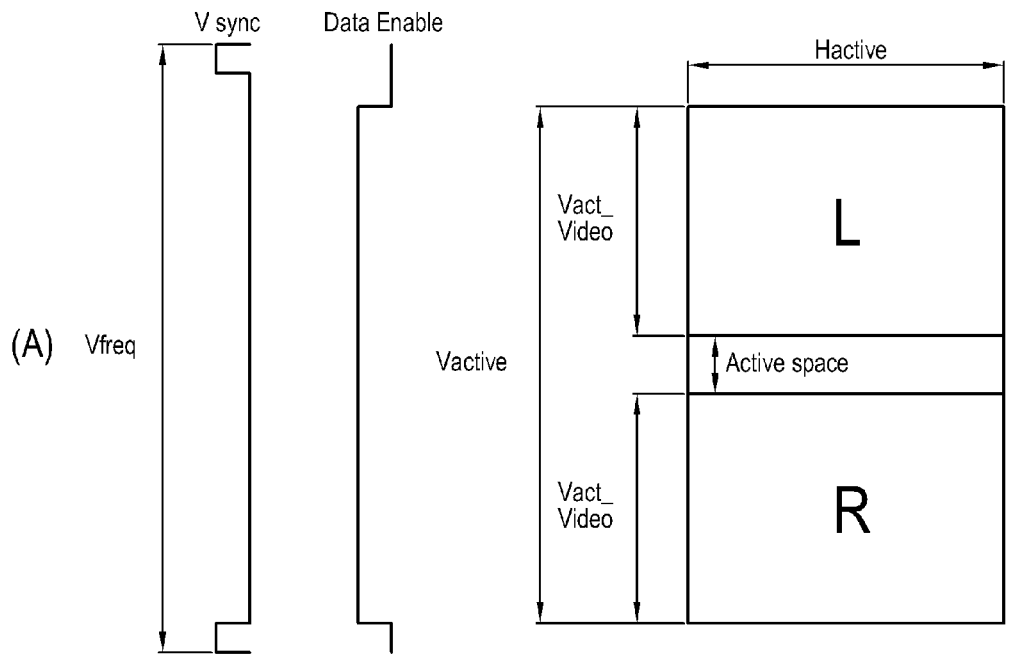
(A)
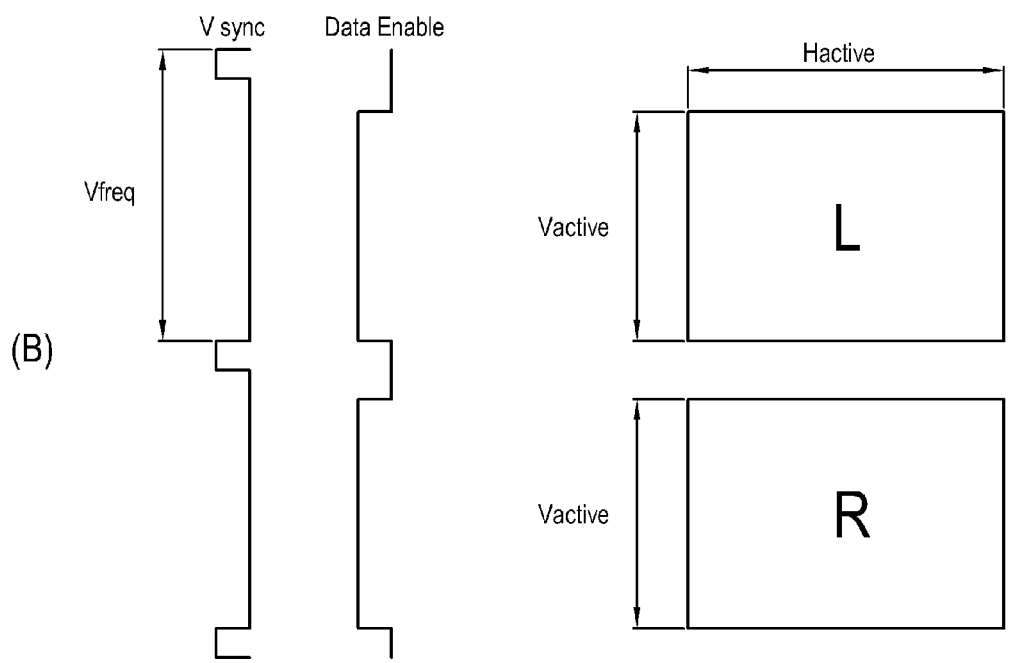
(B)

FIG. 5A
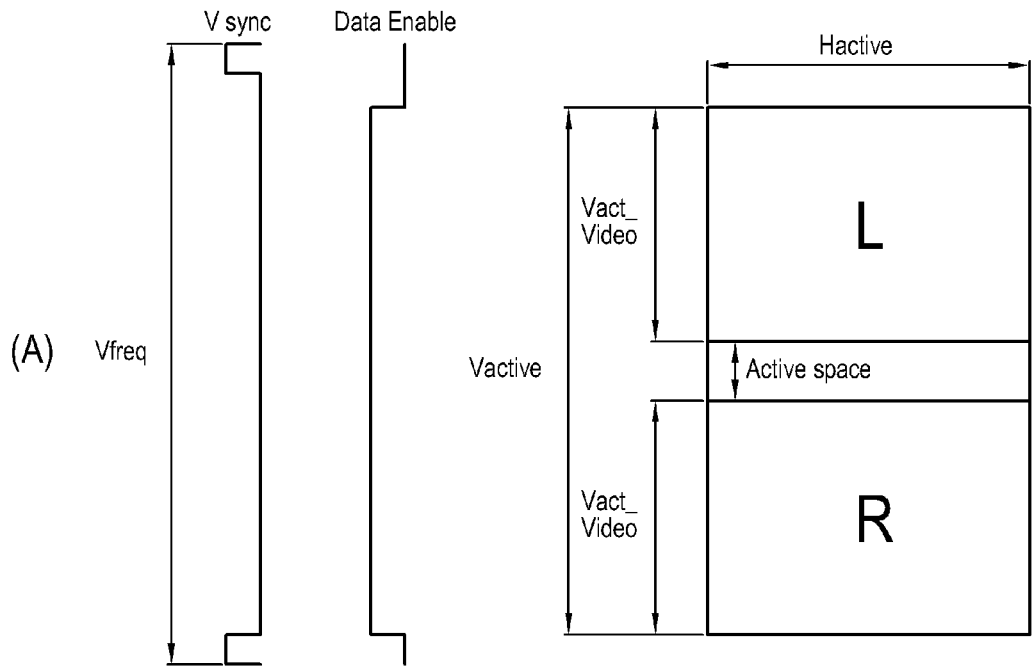
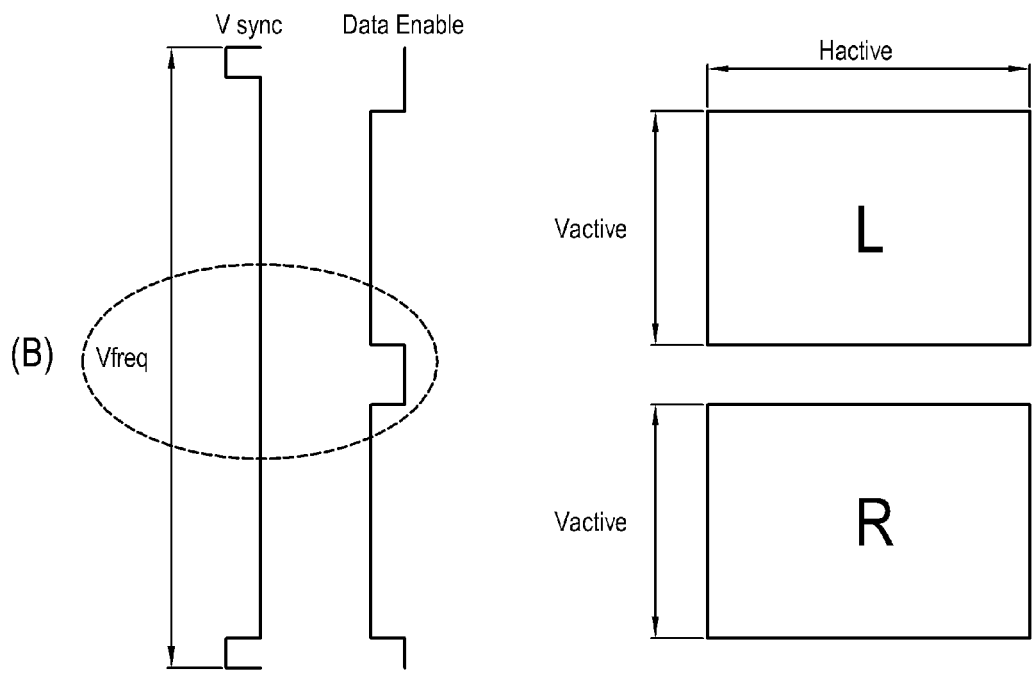

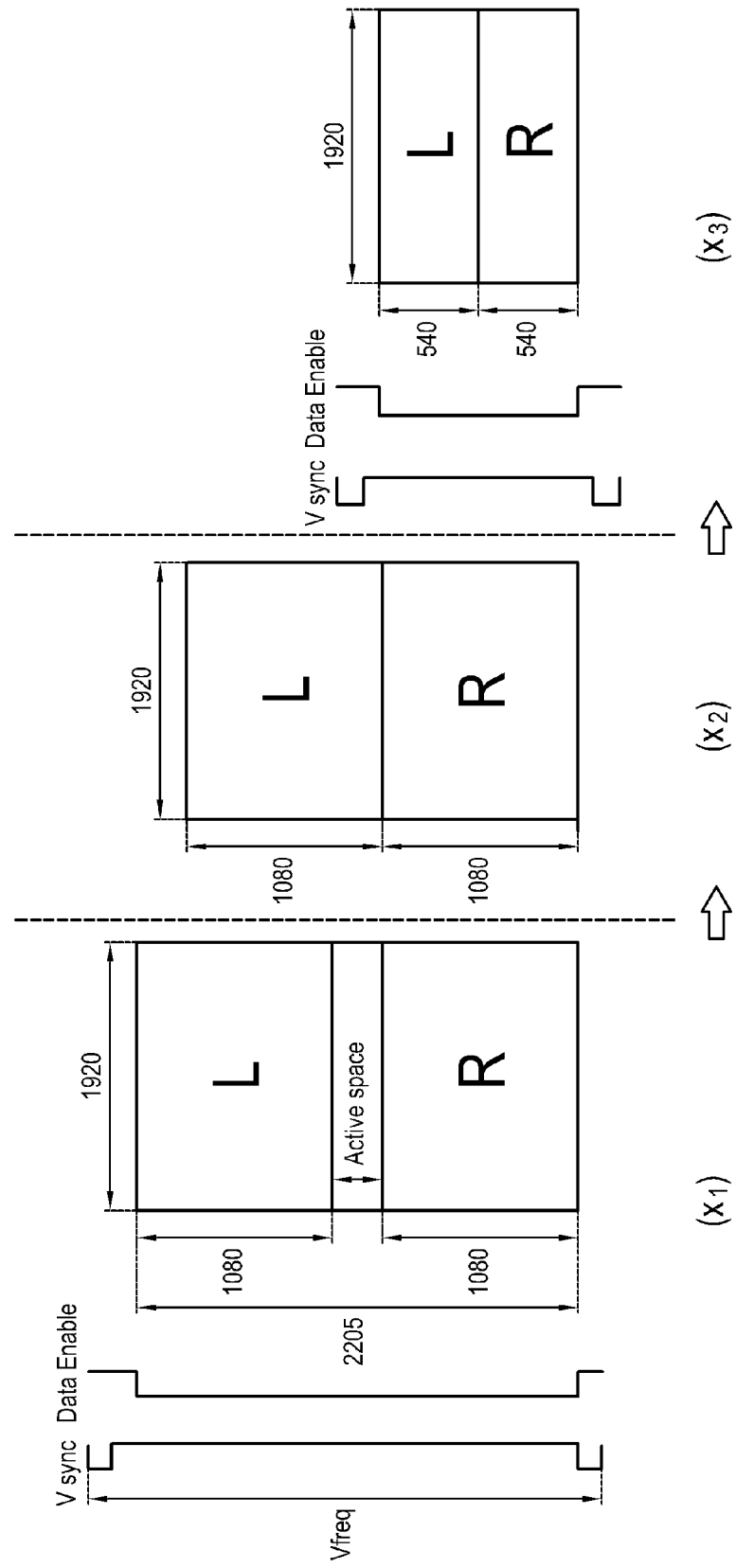

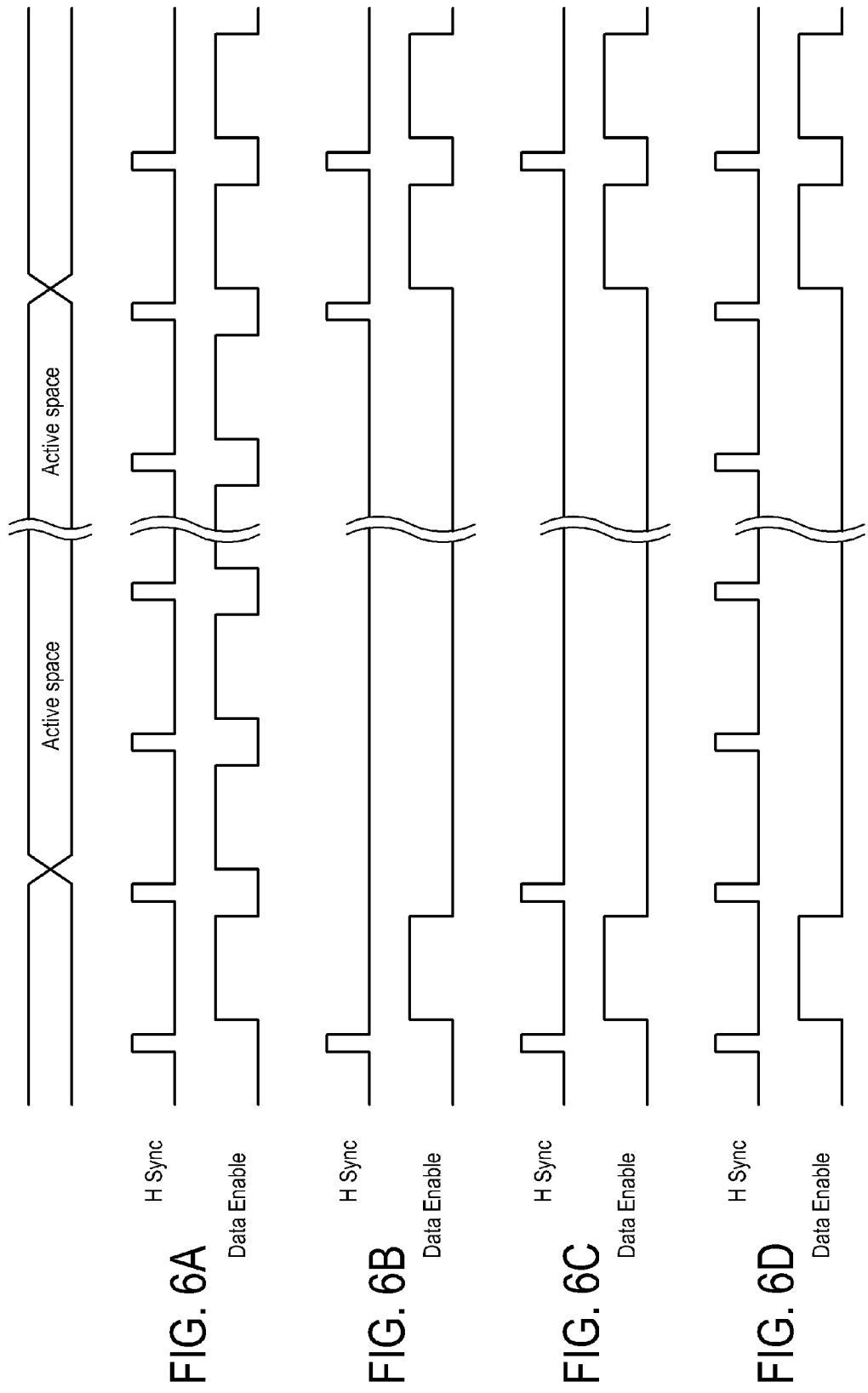

DISPLAY APPARATUS AND CONTROL METHOD THEREOF

CROSS-REFERENCE TO RELATED APPLICATION

This application claims priority from Korean Patent Application No. 10-2009-0128540, filed on Dec. 21, 2009 and 10-2010-0063518, filed on Jul. 1, 2010 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus and a control method thereof which are capable of converting a three-dimensional (3D) image signal, added according to a new standard, into a format, which can be processed by a system that processes a 3D image signal according to an existing standard.

2. Description of the Related Art

When new contents are added to an existing technical standard related to a 3D image signal, or a new technical standard is defined, a 3D image signal of the new technical standard may be defined. In this case, an existing display apparatus which processes the 3D image signal according to the previous technical standard may not recognize the 3D image signal of the new technical standard. Accordingly, the existing display apparatus cannot display a 3D image based on the 3D image signal of the new technical standard.

SUMMARY

Accordingly, one or more exemplary embodiments provide a display apparatus and a display method that are capable of converting a 3D image signal, added according to a new standard, into a format, which can be processed by a system that processes a 3D image signal according to an existing standard.

The foregoing and/or other aspects may be achieved by providing a display apparatus including: a signal receiving unit which receives a three-dimensional (3D) image signal, the 3D image signal including a left eye image and a right eye image; a converter which converts a format of the 3D image signal into a second transmission format if the format of the 3D image signal is of a first transmission format; a 3D processor which processes the converted 3D image signal for 3D display; and a display unit which performs the 3D display with regard to the processed 3D image signal.

The 3D image signal may include a timing signal for displaying the left eye image and the right eye image. The timing signal may include at least one of a horizontal synchronization signal, a vertical synchronization signal, and a data enable signal. The converter may convert the timing signal to correspond to the second transmission format. The timing signal may include a vertical synchronization signal and a data enable signal, and the converter may generate the vertical synchronization signal between the left eye image and the right eye image and disable the data enable signal for an interval between the left eye image and the right eye image. The timing signal may include a vertical synchronization signal and a data enable signal, and the converter may generate no vertical synchronization signal for an interval between the left eye image and the right eye image and disable the data enable signal for the interval between the left eye image and the right eye image. The timing signal may include a vertical synchronization signal and a data enable signal, and the converter may generate the vertical synchronization signal between an odd field and an even field, each of which includes the left eye image and the right eye image, and disable the data enable signal for an interval between the left eye image and the right eye image and an interval between the odd field and the even field. The first transmission format may be based on a frame packing scheme. The second transmission format may be based on one of a frame sequential scheme, a top-and-bottom scheme, a side-by-side scheme and an interlace scheme. The 3D image signal may be formatted in accordance with a high-definition multimedia interface (HDMI) standard. The converter may down-scale vertical resolution of the left eye image and the right eye image, and rearrange the down-scaled left and right eye images according to the top-and-bottom scheme. The converter may down-scale horizontal resolution of the left eye image and the right eye image, and rearrange the down-scaled left and right eye images according to the side-by-side scheme. The 3D processor performs frame rate conversion to alternately display the left eye image and the right eye image of the converted 3D image signal. The first transmission format may have resolution greater than resolution that can be processed by the 3D processor.

The foregoing and/or other aspects may be achieved by providing a control method of a display apparatus, the control method including: receiving a three-dimensional (3D) image signal, the 3D image signal including a left eye image and a right eye image; converting a format of the 3D image signal into a second transmission format if the format of the 3D image signal is of a first transmission format; processing the converted 3D image signal for 3D display; and performing the 3D display with regard to the processed 3D image signal.

The 3D image signal may include a timing signal for displaying the left eye image and the right eye image. The timing signal may include at least one of a horizontal synchronization signal, a vertical synchronization signal, and a data enable signal. The converting may include converting the timing signal to correspond to the second transmission format. The timing signal may include a vertical synchronization signal and a data enable signal, and the converting may include generating the vertical synchronization signal between the left eye image and the right eye image and disabling the data enable signal for an interval between the left eye image and the right eye image. The timing signal may include a vertical synchronization signal and a data enable signal, and the converting may include generating no vertical synchronization signal for an interval between the left eye image and the right eye image and disabling the data enable signal for the interval between the left eye image and the right eye image. The timing signal may include a vertical synchronization signal and a data enable signal, and the converting may include generating the vertical synchronization signal between an odd field and an even field, each of which includes the left eye image and the right eye image, and disabling the data enable signal for an interval between the left eye image and the right eye image and an interval between the odd field and the even field. The first transmission format may be based on a frame packing scheme. The second transmission format may be based on one of a frame sequential scheme, a top-and-bottom scheme, a side-by-side scheme and an interlace scheme. The 3D image signal may be formatted in accordance with a high-definition multimedia interface (HDMI) standard. The converting may include down-scaling vertical resolution of the left eye image and the right eye image, and rearranging the down-scaled left and right eye images according to the top-and-bottom scheme. The converting may include down-scaling horizontal resolution of the left eye image and the right eye image, and rearranging the down-scaled left and right eye images according to the side-by-side scheme. The processing may include performing frame rate conversion to alternately display the left eye image and the right eye image of the converted 3D image signal. The first transmission format has resolution greater than resolution that can be processed by the 3D processor.

According to exemplary embodiments, there are provided a display apparatus and a display method which are capable of converting a 3D image signal added according to a new standard into a format which can be processed by a system which processes a 3D image signal according to an existing standard.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 1 is a block diagram showing a configuration of a display apparatus according to one exemplary embodiment;

FIG. 3 is a view showing a size standard of a 3D image signal for each resolution according to a frame packing scheme defined by an HDMI 1.4 standard;

FIG. 4 is a view for explaining a process of converting a 3D image signal according to a frame packing scheme into a 3D image signal according to a frame sequential scheme;

FIG. 5A is a view for explaining a process of converting a 3D image signal according to a frame packing scheme into a 3D image signal according to a top-and-bottom scheme;

FIG. 5B is a view for explaining another process of converting a 3D image signal according to a frame packing scheme into a 3D image signal according to a top-and-bottom scheme;

FIGS. 6A to 6D are views for explaining various methods of disabling a data enable signal and a horizontal synchronization signal shown in FIG. 5A;

DETAILED DESCRIPTION OF EXEMPLARY EMBODIMENTS

Figure 2A:
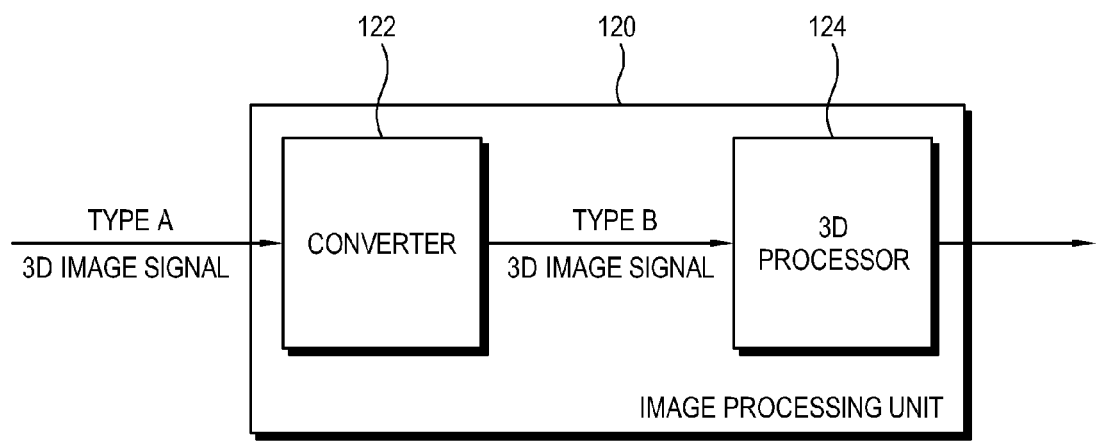
FIGS. 2A and 2B are views showing a flow of a 3D image signal to be processed according to one exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. In the following embodiments, explanations of components having no direct relation to the spirit of the exemplary embodiments are omitted. Expressions such as "at least one of," when preceding a list of elements, modify the entire list of elements and do not modify the individual elements of the list.

FIG. 1 is a block diagram showing a configuration of a display apparatus according to one exemplary embodiment.

In one exemplary embodiment, a display apparatus 100 may be implemented by a digital TV, a desktop computer, a laptop computer, a set-top box, a monitor, or any other apparatus known in the art, so long as the apparatus can process and display (using some form of processor, CPU, controller, etc.) a 3D image.

The display apparatus 100 may include a signal receiving unit 110, an image processing unit 120, and a display unit 130.

The signal receiving unit 110 may receive a 3D image signal including a left eye image and a right eye image. The 3D image signal may further include a timing signal for alternately displaying the left eye image and the right eye image. In this case, the timing signal may include at least one of a horizontal synchronization signal, a vertical synchronization signal, and a data enable signal.

In one exemplary embodiment, the 3D image signal may be based on a frame packing scheme as one of various 3D transmission formats, in which a left eye image, a right eye image, and an active space interval are transmitted in one frame. The left eye image and the right eye image included in the frame packing scheme may generally be displayed without being subjected to a scaling process which increases a resolution. In this case, the active space interval is located between the left eye image and the right eye image and includes descriptive information other than substantial data.

The 3D image signal may be based on a high-definition multimedia interface (HDMI) standard. In this case, the 3D image signal may be based on a transition minimized differential signaling (TMDS) scheme.

If the 3D image signal is of a first transmission format like a frame packing format, the image processing unit 120 may perform a first process to convert the 3D image signal into a second transmission format. Also, if the 3D image signal is beyond scope that can be processed by the display apparatus 100, the image processing unit 120 may perform the first process to convert the 3D image signal into an input format within the scope that can be processed by the display apparatus 100.

Thereafter, the image processing unit 120 may perform a second process, to alternately display the left eye image and the right eye image, based on the converted 3D image signal. To this end, the image processing unit 120 may include a converter 122 and a 3D processor 124.

The converter 122 may perform the first process that converts the 3D image signal into the second transmission format if the 3D image signal is input as the first transmission format like the frame packing format.

The first process may be a process of converting a timing signal, such that the left eye signal and the right eye signal can be alternately displayed. In one exemplary embodiment, the first process may be a process of generating the vertical synchronization signal between the left eye image and the right eye image and disabling the data enable signal for an interval between the left eye image and the right eye image. In an alternative embodiment, the first process may be a process of disabling the data enable signal for an interval between the left eye image and the right eye image. In another alternative embodiment, the first process may be a process of generating the vertical synchronization signal between an odd field and an even field, each of which includes the left eye image and the right eye image, and disabling the data enable signal for an interval between the left eye image and the right eye image and an interval between the odd field and the even field. In still another alternative embodiment, the first process may be a process of deleting an active space interval of a 3D image signal and down-scaling it such that vertical resolution becomes half. In still yet another alternative embodiment, the first process may be a process of deleting an active space interval of a 3D image signal and down-scaling it such that horizontal resolution becomes half.

In other words, the first process may be a process of converting the 3D image signal, according to the frame packing scheme, into a 3D image signal, according to one of: a frame sequential scheme, in which the left eye image and the right eye image are arranged in separate frames and are alternately input; a top-and-bottom scheme, in which the left eye image and the right eye image are respectively arranged in parallel in the upper and lower portions of one frame; a side-by-side scheme, in which the left eye image and the right eye image are arranged in parallel in the left and right portions of one frame; and an interlace scheme, in which two fields, into which one frame is divided, are alternately scanned. For the interlace scheme, which scans the left eye image and the right eye image in an interlacing manner, each of the left eye image and the right eye image is divided into two fields, which are alternately scanned.

The 3D processor 124 may perform the second process of alternately displaying the left eye image and the right eye image, based on the 3D image signal subjected to the first process. In one exemplary embodiment, the 3D processor 124 performs a 3D format for 3D display adapted for the display panel. That is, the 3D processor 124 may also perform scaling to process input of half-resolution, interpolation, correction and reproduction, of the left and right eye images adapted for the display panel. If the display panel is driven at 240 Hz, the 3D processor 124 may perform frame rate conversion to convert input frequency (or input Vsync), e.g., 24 Hz or 48 Hz into 240 Hz.

The display unit 130 may alternately display the left eye image and the right eye image. To this end, the display unit 130 may include a display panel (not shown), which may be implemented by a liquid crystal display (LCD), an organic light emitting display (OLED), a plasma display panel (PDP), or other types of displays known in the art, and a panel driver (not shown).

Figure 2B:
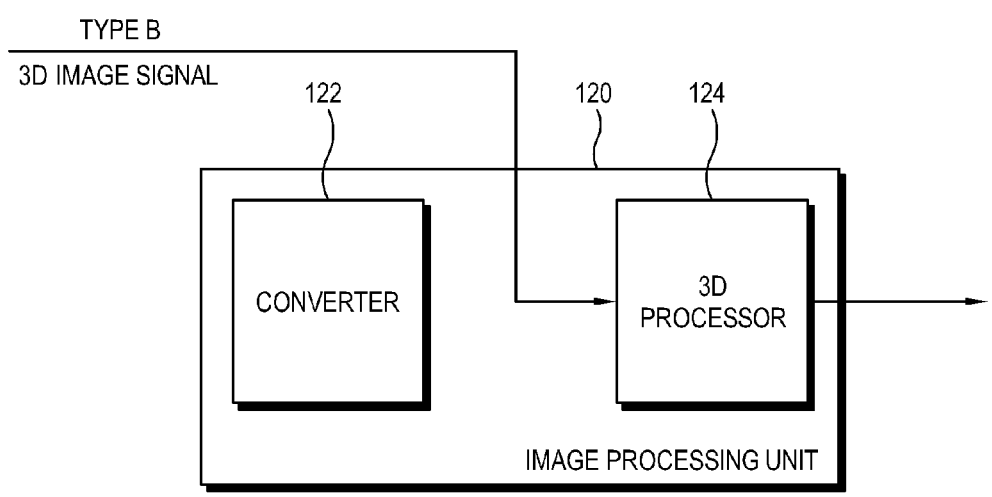

FIGS. 2A and 2B are views showing a processing flow of a 3D image signal, according to one exemplary embodiment;

FIG. 2A shows a case where a 3D image signal is input as the first transmission format such as the frame packing format. In this case, the type A 3D image signal is output through the converter 122 and the 3D processor 124.

The converter 122 performs the first process that converts the 3D image signal into the second transmission format (e.g., the sequential scheme, the top-and-bottom scheme, the side-by-side scheme, the interlace scheme, etc.). Accordingly, the converter 122 converts the type A 3D image signal into a type "B" 3D image signal.

The 3D processor 124 performs the second process to alternately display the left eye image and the right eye image, based on the 3D image signal processed by the first process. In other words, the 3D processor 124 divides the type B 3D image signal, output from the converter 122, into the left eye image and the right eye image, which are to be alternately displayed.

FIG. 2B shows a case where a 3D image signal is input as the second transmission format (e.g., the sequential scheme, the top-and-bottom scheme, the side-by-side scheme and the interlace scheme. Referring to this figure, the type B 3D image signal is input. In this case, the type B 3D image signal bypasses the converter 122 and is output through the 3D processor 124.

Since the converter 122 performs the first process, the type B 3D image signal need not be passed through the converter 122. Accordingly, the type B 3D image signal bypasses the converter 122 and is input directly to the 3D processor 124.

The 3D processor 124 performs the second process of dividing the input type B 3D image signal into the left eye image and the right eye image, which are to be alternately displayed.

FIG. 3 is a view showing a size standard of a 3D image signal, for each resolution, according to a frame packing scheme defined by an HDMI 1.4 standard.

As shown in FIG. 3, 1080p scans a frame having a 1920×1080 resolution in a progressive manner. For the resolution of 1080p (310), the number of horizontal scan lines included on a Hactive interval is 1920 (311). The left eye image and the right eye image are vertically arranged in parallel in a frame according to the frame packing scheme, with an active space interval interposed between the left eye image and the right eye image. Since the number of vertical scan lines for each of the left eye image and the right eye image is 1080, the number of vertical scan lines presented in a Vactive interval, in which the left eye image and the right eye image are included, is 2160 (312). The number of vertical scan lines in the Vactive space interval is 45 (313). Accordingly, the number of vertical scan lines of the frame according to the frame packing scheme is 2205 (=1080×2+45).

For a resolution of 720p (320), the number of horizontal scan lines included on the Hactive interval is 1280 (321). Since the number of vertical scan lines for each of the left eye image and the right eye image is 720, the number of vertical scan lines presented in the Vactive interval, in which the left eye image and the right eye image are included, is 1440 (322). The number of vertical scan lines in the Vactive space interval is 30 (323). Accordingly, the number of vertical scan lines of the frame, according to the frame packing scheme, is 1470 (=720×2+30).

In 1080i, a frame having a 1920×1080 resolution is scanned in an interlacing manner. For the resolution of 1080i (330), the number of horizontal scan lines included on the Hactive interval is 1920 (331). Each of the left eye image and the right eye image is divided into two fields, to be scanned, and the number of vertical scan lines for each of the left eye image and the right eye image included in the respective fields is 540. Accordingly, the number of vertical scan lines presented in the Vactive interval, in which the left eye image and the right eye image are included, is 2160 (332). The number of vertical scan lines in the Vactive space interval is 23, 22, and 23, respectively (333). Accordingly, the number of vertical scan lines of the frame, according to the frame packing scheme, is 2228 (=540×4+23+22+23).

FIG. 4 is a view for explaining a process of converting a 3D image signal, according to a frame packing scheme, into a 3D image signal, according to a frame sequential scheme.

(A) of FIG. 4 shows a 3D image signal according to the frame packing scheme. In this case, the number of vertical scan lines for the 3D image signal is greater than the number of vertical scan lines that can be processed by an existing system. For example, the 3D image signal shown in (A) of FIG. 4 has the resolution of 1080p shown in FIG. 3. The existing 3D processor 124 has the ability to process a 3D image signal up to a resolution of 1920×2048. For a 3D image signal having a resolution of 1080p, the number of vertical scan lines is 2205, which exceeds 2048. Accordingly, the existing 3D processor 124 cannot process the 3D image signal having the resolution of 1080p shown in FIG. 3.

(B) of FIG. 4 shows a 3D image signal according to the frame sequential scheme. The display apparatus 100 may convert the 3D image signal, according to the frame packing scheme, into the 3D image signal, according to the frame sequential scheme. More specifically, the display apparatus 100 may generate and insert a vertical synchronization signal Vsync between the left eye image and the right eye image, and disables a data enable signal for an interval between the left eye image and the right eye image.

In other words, the data enable signal for the active space interval shown in (A) of FIG. 4 is disabled, and the left eye image and the right eye image are separated from each other. In addition, to double a vertical frequency, the vertical synchronization signal is inserted in the active space interval shown in (A) of FIG. 4, and the left eye image and the right eye image are alternately input for the respective frames.

In this manner, it is possible to convert a 3D image signal of a new standard, according to the frame packing scheme, into a 3D image signal according to the frame sequential scheme, which can be processed by the existing display apparatus 100.

FIG. 5A is a view for explaining a process of converting a 3D image signal, according to a frame packing scheme, into a 3D image signal, according to a top-and-bottom scheme.

(A) of FIG. 5A shows a 3D image signal according to the frame packing scheme. In this case, the 3D processor 124 may not recognize the frame packing scheme. That is, the 3D processor 124 may not recognize a 3D image signal according to a new scheme other than the existing 3D image signal processing scheme, such as a top-and-bottom scheme, a side-by-side scheme, and the like. Also, the 3D processor 124 may not recognize a 3D image signal if receiving the 3D image signal according to a format other than a preset input format.

In (A) of FIG. 5A, the number of vertical scan lines for the 3D image signal does not exceed the number of vertical scan lines which can be processed by an existing system. For example, the 3D image signal shown in (A) of FIG. 5A has the resolution of 720p shown in FIG. 3. The existing display apparatus 100 has the ability to process a 3D image signal up to a resolution of 1920×2048. For a 3D image signal having a resolution of 720p, the number of vertical scan lines is 1470, which does not exceed 2048.

(B) of FIG. 5A shows a 3D image signal according to the top-and-bottom scheme. The display apparatus 100 may convert the 3D image signal, according to the frame packing scheme, into the 3D image signal, according to the top-and-bottom scheme. More specifically, the display apparatus 100 may disable a data enable signal for an interval between the left eye image and the right eye image. In other words, a horizontal synchronization signal Hsync and the data enable signal for the active space interval shown in (A) of FIG. 5A are disabled, and the left eye image and the right eye image are separated from each other.

Since the number of vertical scan lines for the 3D image signal does not exceed the number of vertical scan lines, which can be processed by an existing system, the display apparatus 100 can process the separated left and right eye images. Accordingly, it is unnecessary to double a vertical frequency by inserting the vertical synchronization signal in the active space interval.

In this manner, it is possible to convert a 3D image signal of a new standard, according to the frame packing scheme, into a 3D image signal, according to the top-and-bottom scheme, which can be processed by the existing display apparatus 100.

FIG. 5B is a view for explaining another process of converting a 3D image signal according to a frame packing scheme into a 3D image signal according to a top-and-bottom scheme.

(X1) of FIG. 5B shows a 3D image signal according to the frame packing scheme. As shown therein, the 3D image signal has a resolution of 1080p shown in FIG. 3. In this case, the number of vertical scan lines of one frame is 2205 (=1080×2+45).

The existing system has the ability to process a 3D image signal up to a resolution of 1920×2048. Thus, the number of vertical scan lines of the 3D image signal shown in (X1) of FIG. 5B exceeds the number of vertical scan lines that can be processed by the existing system.

Accordingly, in the case that the 3D image signal of the resolution 1080p according to the frame packing scheme is input, the display apparatus 100 may delete the active space interval of the input 3D image signal (e.g., by disabling the data enable signal of the active space interval), down-scale it such that the vertical resolution becomes half, and convert the input 3D image signal into a 3D image signal according to the top-and-bottom scheme.

(X2) of FIG. 5B shows the 3D image signal after deleting the active space interval.

(X3) of FIG. 5B shows the 3D image signal after down-scaling it such that the vertical resolution becomes half. Each of the left eye image and the right eye image of the down-scaled image has a resolution of 1920×540, so that one frame can have the total resolution of 1920×1080 and become a 3D image signal according to the top-and-bottom scheme that can be processed by the existing system.

FIGS. 6A to 6D are views for explaining various methods of disabling the data enable signal and the horizontal synchronization signal shown in FIG. 5A.

Assuming that waveforms of the data enable signal and the horizontal synchronization signal are as shown in upper of FIG. 6A, the data enable signal and the horizontal synchronization signal may be disabled according to any of the methods shown in FIG. 6B and FIG. 6D, depending on a system.

Specifically, as shown in FIG. 6B, the data enable signal and the horizontal synchronization signal Hsync for the active space interval may be disabled. In addition, as shown in FIG. 6C, the data enable signal for the active space interval and the second horizontal synchronization signal in the active space interval to the first horizontal synchronization signal after the active space interval may be disabled. Moreover, as shown in FIG. 6D, only the data enable signal for the active space interval may be disabled.

Figure 7:
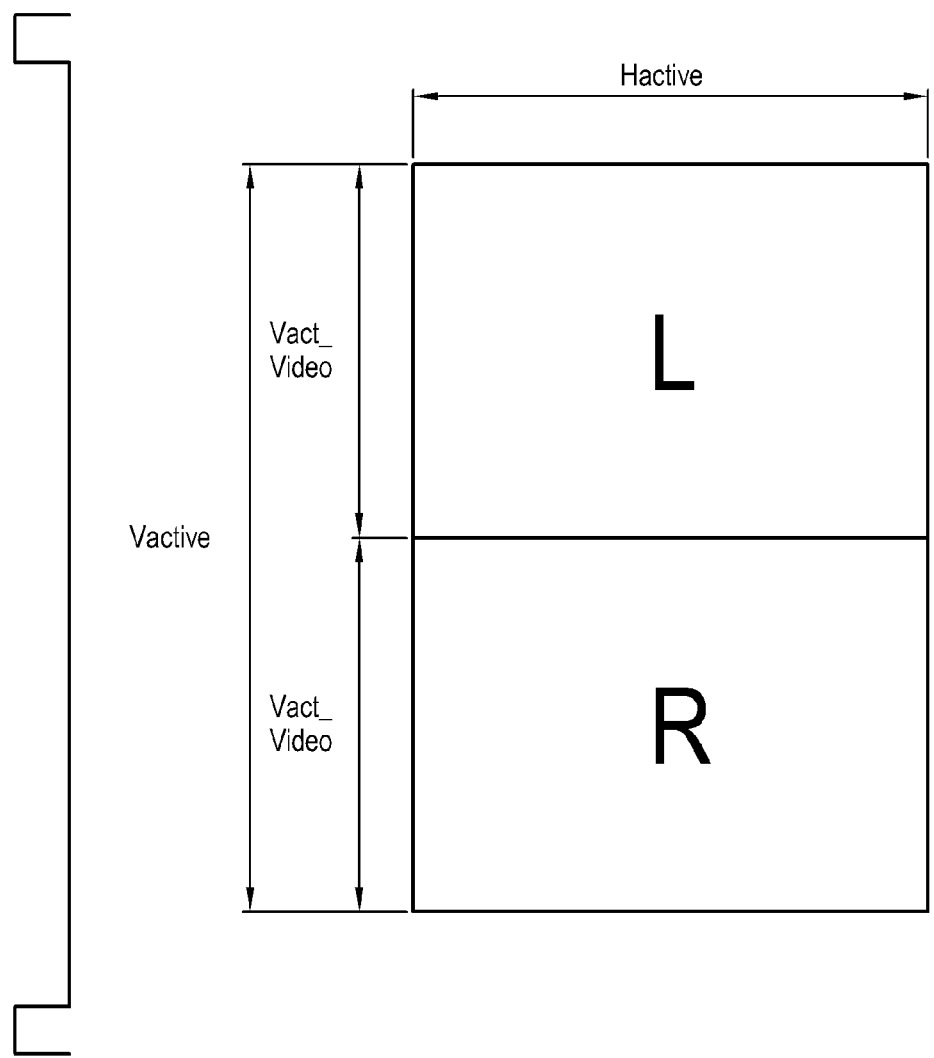
FIG. 7 is a view showing an image signal input as a result of the processing in FIGS. 6A to 6D.

In this manner, if the data enable signal and the horizontal synchronization signal Hsync are disabled in various ways, it provides the same effect as the input of 3D image signal shown in FIG. 7.

Figure 8:
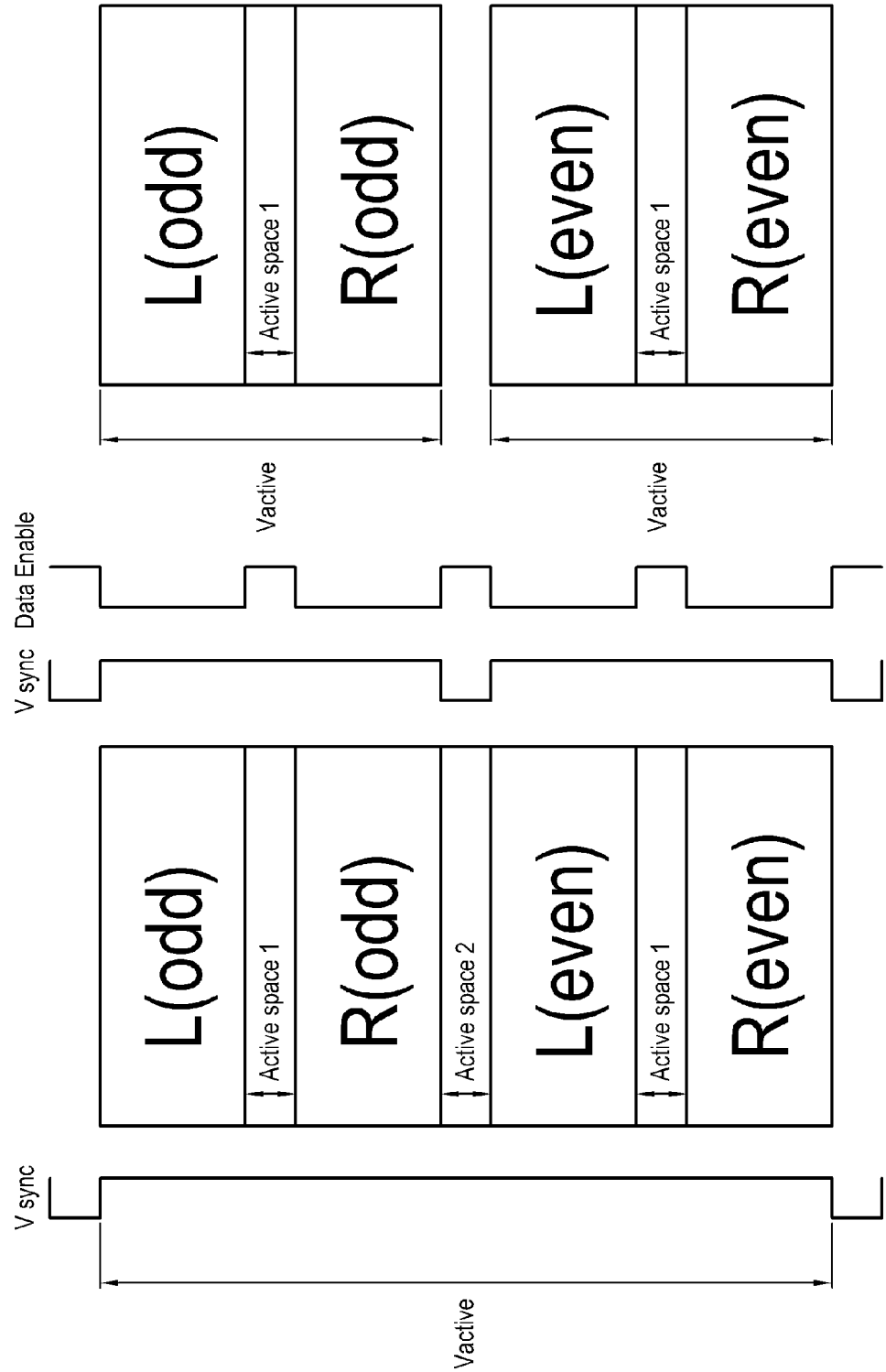
FIG. 8 is a view for explaining a process of converting a 3D image signal according to a frame packing scheme into a 3D image signal according to an existing interlace scheme.

FIG. 8 is a view for explaining a process of converting a 3D image signal, according to a frame packing scheme, into a 3D image signal, according to an existing interlace scheme.

In FIG. 8, an image signal shown on the left is a 3D image signal, according to the frame packing scheme, which is scanned according to the interlace scheme. In this case, the number of vertical scan lines for the 3D image signal is greater than the number of vertical scan lines that can be processes by an existing system. For example, the 3D image signal shown on the left has the resolution of 1080i shown in FIG. 3. The existing display apparatus has the ability to process a 3D image signal up to a resolution of 1920×2048. For a 3D image signal having a resolution of 1080i, the number of vertical scan lines is 2228, which exceeds 2048. Accordingly, the existing display apparatus cannot process the 3D image signal having the resolution of 1080i shown in FIG. 3.

An image signal shown on the right is a 3D image signal according to the interlace scheme. The display apparatus 100 may convert the 3D image signal, according to the frame packing scheme, into the 3D image signal, according to the interlace scheme. Specifically, the display apparatus 100 may generate a vertical synchronization signal between an odd field and an even field, each of which includes the left eye image and the right eye image, and disable the data enable signal for an interval between the odd field and the even field and an interval between the left eye image and the right eye image.

In other words, in order to double a vertical frequency, the vertical synchronization signal is inserted in an active space 2 interval for the image signal shown on the left and the odd field and the even field are alternately input as separate frames. In addition, the data enable signal for an active space 1 interval (an interval between the left eye image and the right eye image included in the odd field and an interval between the left eye image and the right eye image included in the even field) and the active space 2 interval are disabled, so that the left eye image and the right eye image are separated from each other.

In this manner, the image signal, according to the frame packing scheme, can be converted into the image signal, according to the interlace scheme, by inserting an interlace vertical synchronization signal Vsync.

Figure 9:
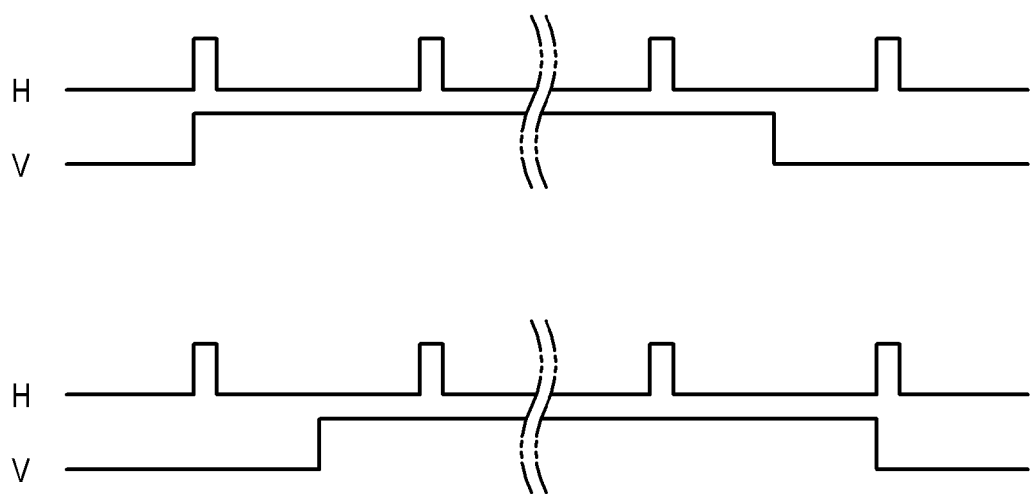
FIG. 9 is a view for explaining various methods of inserting a vertical synchronization signal shown in FIG. 8.

FIG. 9 is a view for explaining various methods of inserting the vertical synchronization signal shown in FIG. 8.

An image signal may include interlace information, which corresponds to ½ of a vertical synchronization signal, according to any of various methods shown in FIG. 9 depending on a system.

Specifically, as shown on the top, a vertical synchronization signal Vsync may be generated at a half (½) period of a horizontal synchronization signal Hsync. In addition, as shown on the bottom, a vertical synchronization signal Vsync may be generated such that width of the vertical synchronization signal Vsync includes a half period.

Figure 10:
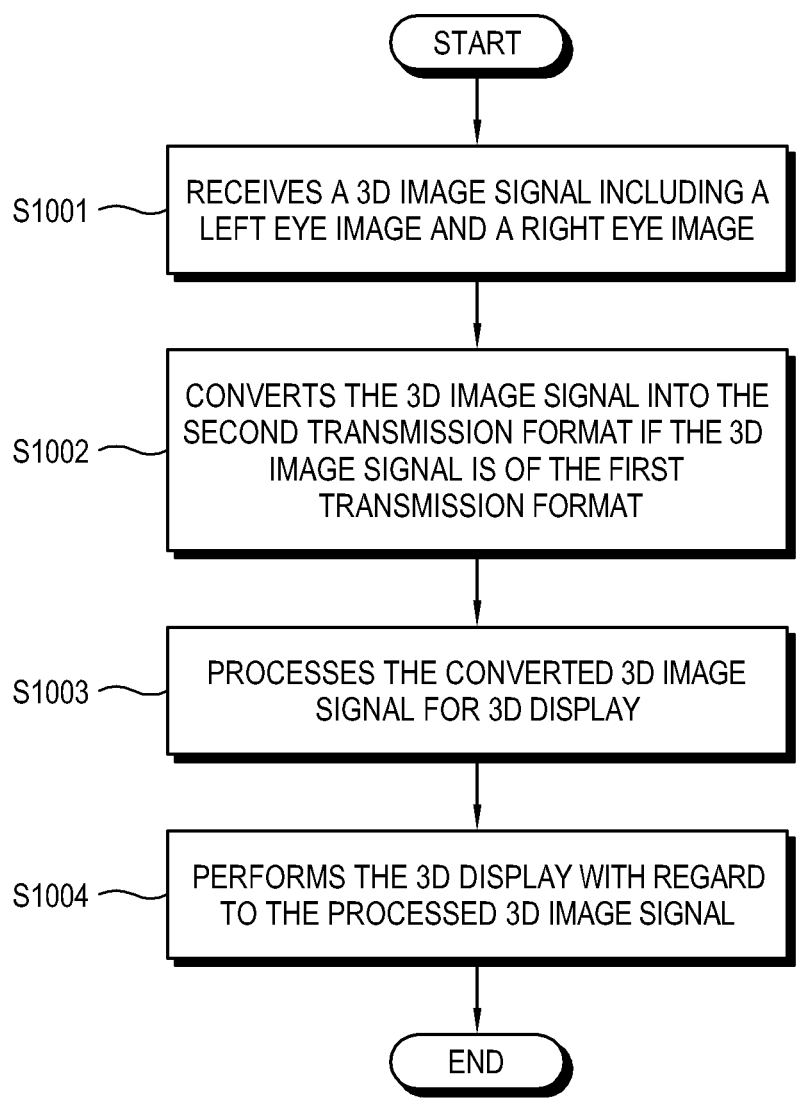
FIG. 10 is a flowchart showing a control method of a display apparatus according to one exemplary embodiment.

FIG. 10 is a flowchart showing a control method of display apparatus according to one exemplary embodiment.

Referring to FIG. 10, the display apparatus 100 receives a 3D image signal including a left eye image and a right eye image (S1001).

If the 3D image signal is of the first transmission format, the display apparatus 100 converts the 3D image signal into the second transmission format (S1002).

The display apparatus 100 processes the converted 3D image signal for 3D display (S1003).

The display apparatus 100 performs the 3D display with regard to the processed 3D image signal (S1004).

Figure 11A:
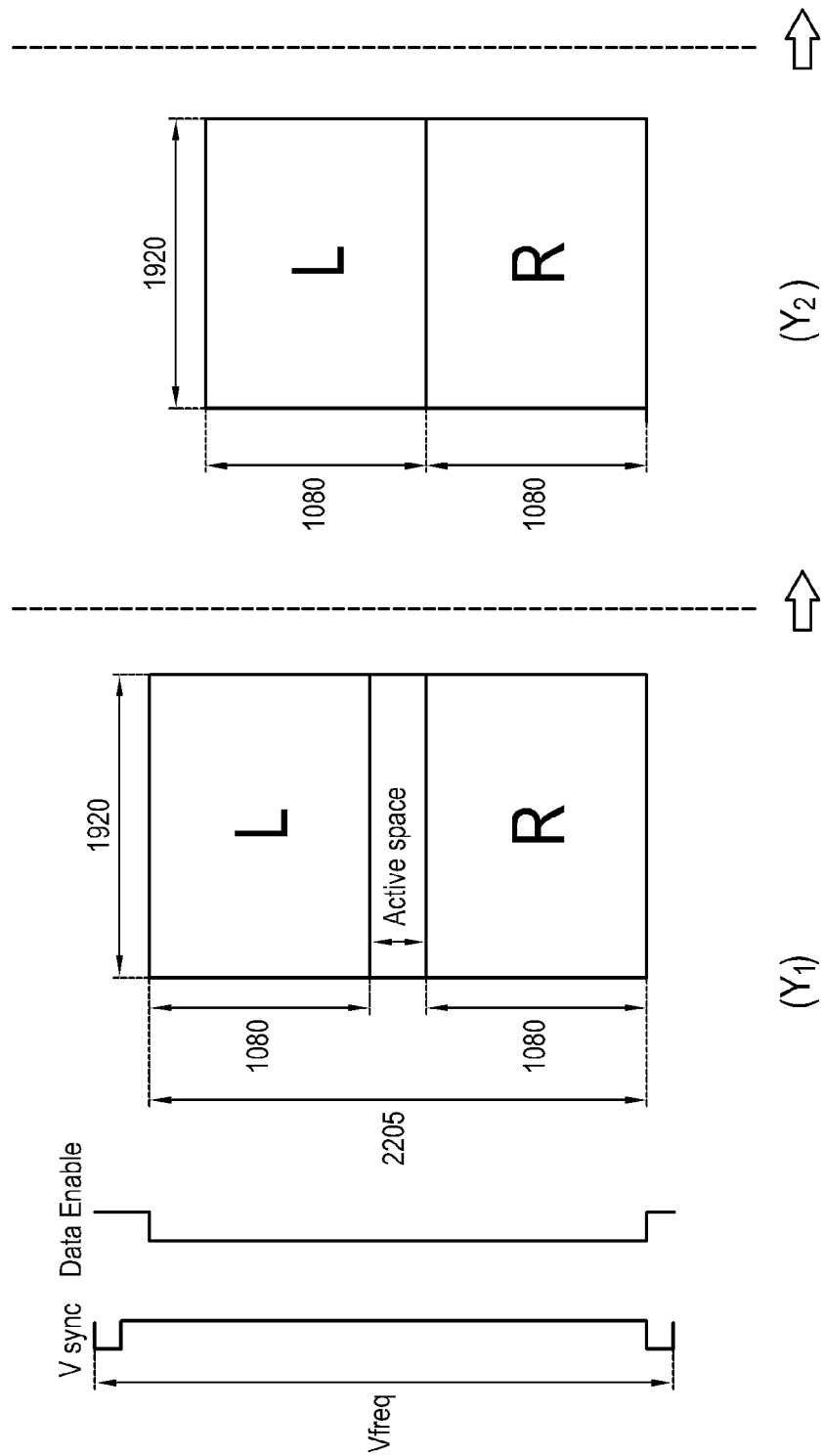
FIGS. 11A and 11B are views for explaining a process of converting a 3D image signal according to a frame packing scheme into a 3D image signal according to a side-by-side scheme.
Figure 11B:
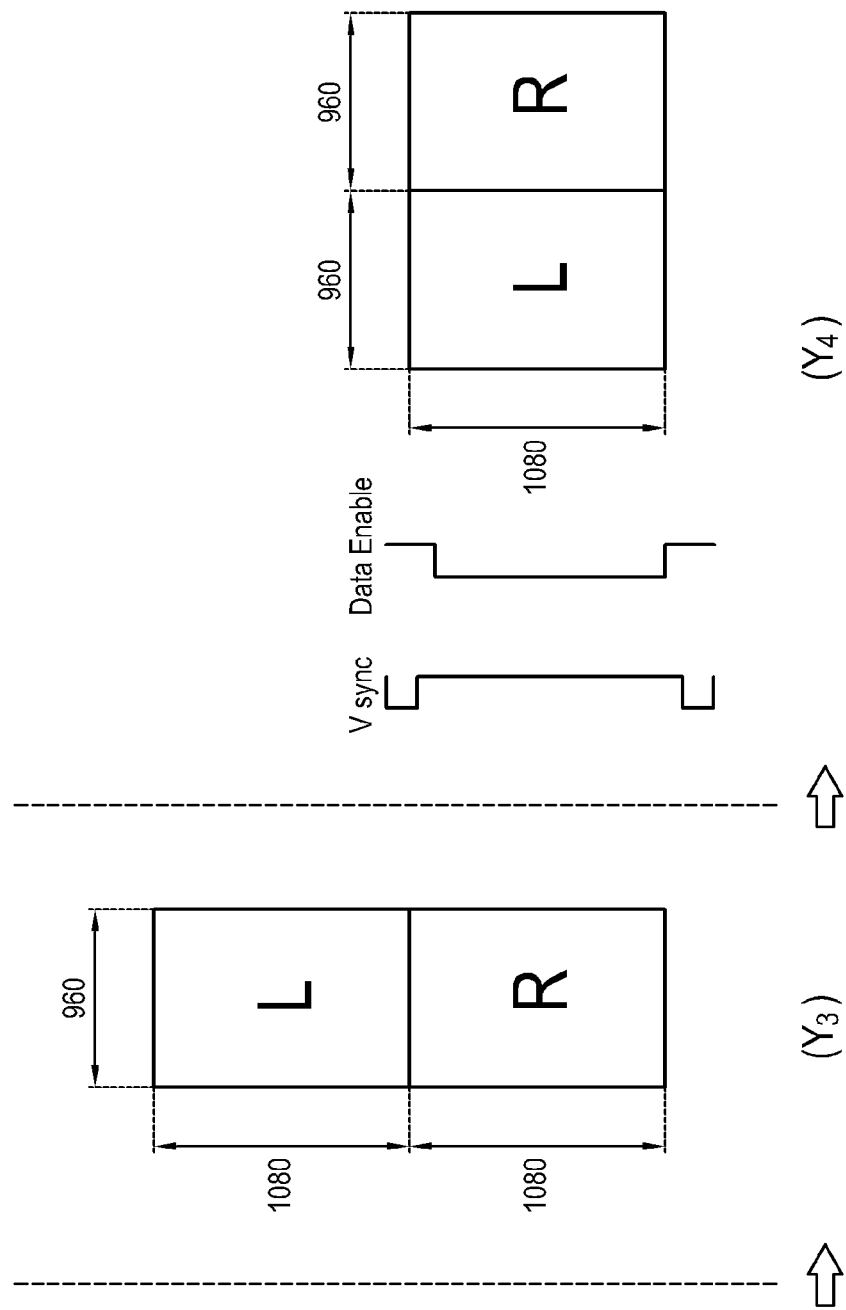

FIGS. 11A and 11B are views for explaining a process of converting a 3D image signal according to the frame packing scheme into a 3D image signal according to the side-by-side scheme.

(Y1) of FIG. 11A shows a 3D image signal according to the frame packing scheme. Referring to this, the 3D image signal has a resolution of 1080p shown in FIG. 3. In this case, the number of vertical scan lines of one frame is 2205. The number of vertical scan lines of the 3D image signal shown in (Y1) of FIG. 11A exceeds the number of vertical scan lines that can be processed by the existing system.

Accordingly, in the case that the 3D image signal of the resolution 1080p according to the frame packing scheme is input, the display apparatus 100 may delete the active space interval of the input 3D image signal, down-scale it such that the horizontal resolution becomes half, and convert the input 3D image signal into a 3D image signal according to the side-by-side scheme.

(Y2) of FIG. 11A shows the 3D image signal after deleting the active space interval.

(Y3) of FIG. 11B shows the 3D image signal after down-scaling it such that the horizontal resolution becomes half. Each of the left eye image and the right eye image of the down-scaled image has a resolution of 960×1080. In this case, the left eye image and the right eye image are rearranged so that one frame can have the total resolution of 1920×1080.

(Y4) of FIG. 11B shows the 3D image signal after rearranging the left eye image and the right eye image. In this case, since one frame has a total resolution of 1920×1080, the 3D image signal can become a 3D image signal according to the side-by-side scheme that can be processed by the existing system.

The display method may be embodied as computer readable code recorded on a computer readable recording medium for causing a computer or processor to implement the method when executing the computer readable code. The computer readable medium may be any recording medium capable of storing data that is read and/or executed by a computer system or processor, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network. Alternatively, the method of switching the IC card may be embodied as computer readable code transmitted over a transmission medium, such as carrier waves, for transmission over a network, such as the Internet.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
    a signal receiving unit which receives a three-dimensional (3D) image signal comprising a left eye image and a right eye image;
    a converter which converts a format of the 3D image signal from a first transmission format to a second transmission format if the transmission format of the recieved 3D image signal is the first transmission format and output a 3D image signal of the second transmission format; and
    a 3D processor to process the 3D image signal of the second transmission format for 3D display by a display unit,
    wherein the first transmission format is based on a frame packing scheme; and
    the second transmission format is based on one of a frame sequential scheme, a top-and-bottom scheme, a side-by-side scheme, and an interlace scheme.

2. The display apparatus according to claim 1, wherein the 3D image signal comprises a timing signal for alternately displaying the left eye image and the right eye image on the display unit.

3. The display apparatus according to claim 2, wherein the timing signal comprises at least one of a horizontal synchronization signal, a vertical synchronization signal, and a data enable signal, and wherein the converter converts the timing signal to a timing signal for the second transmission format if the transmission format of the received 3D image signal is the first transmission format.

4. The display apparatus according to claim 2, wherein the timing signal comprises a vertical synchronization signal and a data enable signal, and the converter converts the timing signal to a timing signal for the second transmission format if the transmission format of the received 3D image signal is the first transmission format.

5. The display apparatus according to claim 4, wherein the vertical synchronization signal of the converted timing signal includes a pulse that occurs between the left eye image and the right eye image, and the data enable signal of the converted timing signal is disabled for an interval between the left eye image and the right eye image.

6. The display apparatus according to claim 4, wherein the vertical synchronization signal of the converted timing signal includes no pulse corresponding to an interval between the left eye image and the right eye image, and the data enable signal of the converted timing signal is disabled for an interval between the left eye image and the right eye image.

7. The display apparatus according to claim 4, wherein the vertical synchronization signal of the converted timing signal includes a pulse that occurs between an odd field and an even field, each of which comprises images corresponding to the left eye image and the right eye image, and the data enable signal of the converted timing signal is disabled for an interval between the left eye image and the right eye image of either field and for an interval between the odd field and the even field.

8. The display apparatus according to claim 1, wherein the converter down-scales vertical resolution of the left eye image and the right eye image and rearranges the down-scaled left and right eye images according to the top-and-bottom scheme if the second transmission format is based on the top-and-bottom scheme, and wherein the converter down-scales horizontal resolution of the left eye image and the right eye image and rearranges the down-scaled left and right eye images according to the side-by-side scheme if the second transmission format is based on the side-by-side scheme.

9. The display apparatus according to claim 1, wherein the 3D image signal is formatted in accordance with a high-definition multimedia interface (HDMI) standard.

10. The display apparatus according to claim 1, wherein the 3D processor performs frame rate conversion to alternately display the left eye image and the right eye image of the 3D image signal of the second transmission format.

11. The display apparatus according to claim 1, wherein the converter is configured to convert the transmission format of a 3D image signal having a resolution greater than that which can be processed by the 3D processor.

12. A control method of a display apparatus, the control method comprising:
receiving a three-dimensional (3D) image signal comprising a left eye image and a right eye image, the received 3D signal having a transmission format;
converting the transmission format of the received 3D image signal from a first transmission format to a second transmission format if the transmission format of the received 3D image signal is the first transmission format, to output a 3D image signal of the second transmission format; and
processing the 3D image signal of the second transmission format for 3D display by a display unit,
wherein the first transmission format is based on a frame packing scheme; and the second transmission format is based on one of a frame sequential scheme, a top-and-bottom scheme, a side-by-side scheme, and an interlace scheme.

13. The control method according to claim 12, wherein the 3D image signal comprises a timing signal for alternately displaying the left eye image and the right eye image on the display unit.

14. The control method according to claim 13, wherein the timing signal comprises at least one of a horizontal synchronization signal, a vertical synchronization signal, and a data enable signal, and the converting comprises converting the timing signal to a timing signal for the second transmission format if the transmission format of the received 3D image signal is the first transmission format.

15. The control method according to claim 13, wherein the timing signal comprises a vertical synchronization signal and a data enable signal, and the converting comprises converting the timing signal to a timing signal for the second transmission format if the transmission format of the received 3D image signal is the first transmission format.

16. The control method according to claim 15, wherein the vertical synchronization signal of the converted timing signal includes a pulse that occurs between the left eye image and the right eye image, and the data enable signal of the converted timing signal is disabled for an interval between the left eye image and the right eye image.

17. The control method according to claim 15, wherein the vertical synchronization signal of the converted timing signal includes no pulse corresponding to an interval between the left eye image and the right eye image, and the data enable signal of the converted timing signal is disabled for the interval between the left eye image and the right eye image.

18. The control method according to claim 15, wherein the vertical synchronization signal of the converted timing signal includes a pulse that occurs between an odd field and an even field, each of which comprises images corresponding to the left eye image and the right eye image, and the data enable signal of the converted timing signal is disabled for an interval between the left eye image and the right eye image of either field and for an interval between the odd field and the even field.

19. The control method according to claim 12, wherein the converting comprises down-scaling vertical resolution of the left eye image and the right eye image and rearranging the down-scaled left and right eye images according to the top-and-bottom scheme if the second transmission format is based on the top-and-bottom scheme, and wherein the converting comprises down-scaling horizontal resolution of the left eye image and the right eye image and rearranging the down-scaled left and right eye images according to the side-by-side scheme if the second transmission format is based on the side-by-side scheme.

20. The control method according to claim 12, wherein the 3D image signal is formatted in accordance with a high-definition multimedia interface (HDMI) standard.

21. The control method according to claim 12, wherein the processing comprises:
performing frame rate conversion to alternately display the left eye image and the right eye image of the 3D image signal of the second transmission format.

22. The control method according to claim 12, wherein the converting comprises converting the transmission format of a 3D image signal having a resolution greater than that which can be processed by the 3D processor.

23. The display apparatus according to claim 1, wherein the display unit alternately displays the left eye image and the right eye image based on the processed 3D image signal.

24. The display apparatus according to claim 1, wherein the frame packing scheme is one of 3D transmission formats in which a left eye image, a right eye image, and an active space interval are transmitted on one frame.

25. The display apparatus according to claim 1, wherein the frame packing scheme is one of 3D transmission formats in which a left eye image, a right eye image, and descriptive information between the left image and the right image are transmitted on one frame.

26. The method according to claim 12, wherein the frame packing scheme is one of 3D transmission formats in which a left eye image, a right eye image, and an active space interval are transmitted on one frame.

27. The method according to claim 12, wherein the frame packing scheme is one of 3D transmission formats in which a left eye image, a right eye image, and descriptive information between the left image and the right image are transmitted on one frame.

* * * * *